PROCESS FOR PRODUCING DENSE CERAMIC OF LEAD ZIRCONATE-TITANATE

Filed Feb. 6, 1964 2 Sheets-Sheet 1

INVENTOR.
WILLIAM R. BRATSCHUN
BY Robert O. Vidas
ATTORNEY

INVENTOR.
WILLIAM R. BRATSCHUN
BY Robert O. Vidas
ATTORNEY 3,303,133
Patented Feb. 7, 1967

3,303,133

PROCESS FOR PRODUCING DENSE CERAMIC OF LEAD ZIRCONATE-TITANATE

William R. Bratschun, Hopkins, Minn., assignor to Honeywell Inc., a corporation of Delaware Filed Feb. 6, 1964, Ser. No. 342,890
5 Claims. (Cl. 252—62.9)

The present invention is directed to improved methods of forming high density ferroelectric compositions. More particularly, the present invention is directed to a method of forming high density piezoelectric lead zirconate-lead titanate compositions wherein the atmosphere surrounding the ceramic bodies contains cadmium oxide.

Since the initial discoveries of Bernard Jaffe, reported in the Journal of Research of the National Bureau of Standards, vol. 55, No. 5, November 1955, that solid solutions of lead zirconate-lead titanate possess ferroelectric properties and may be polarized, numerous investigators have attempted to improve on and modify the characteristics of lead zirconate-lead titanate compositions. For example, my co-pending application, Serial No. 247,211, filed December 26, 1962, entitled, "Ferroelectric Ceramics," and assigned to the same assignee as the present invention, now Patent 3,194,765, describes a lead zirconate-lead titanate composition including certain specific quantities of cadmium oxide substituted for a portion of the lead oxide in lead zirconate-lead titanate compositions.

With the exception of the previously referred to patent application, all of the compositions suggested by previous investigators have required very high temperature and/or extended firing times in order to obtain the needed density of these ceramic materials for piezoelectric purposes. I have discovered that by inclusion of a quantity of cadmium oxide in the atmosphere surrounding piezoelectric compositions during their firing period, one may markedly lower the necessary firing temperature and/or time of firing. This can be accomplished without deleterious alteration of the electrical properties of the material being fired.

The objects and advantages of the present invention can best be discovered from a study of the following specification and drawing, wherein:
specification and drawings, wherein.

Before discussing the process and advantages of the present invention, it would perhaps be well to review some of the characteristics of prior art compositions and of prior art firing techniques. Tabulated below are 4 different compositions which have found commercial significance.

| | |
|---|---|
| I—Material | $Pb(Zr_{0.55}Ti_{0.45})O_3$ |
| II—Material | $Pb(Zr_{0.53}Ti_{0.47})O_3$ |
| III—Material | $(Pb_{0.95}Sr_{0.05})Zr_{0.53}Ti_{0.47}—O_3$ |
| IV—Material | $Pb(Zr_{0.53}Ti_{0.47})O_3+0.0123PbNb_2O_6$ |

While the discussion of the invention will be limited to these commercially useful materials, it should be appreciated that the invention is equally extendable to other formulations of solid solutions of lead zirconate and lead titanate wherein the atomic ratio of Zr to Ti is from 90:10 to 40:60.

Figure 1:
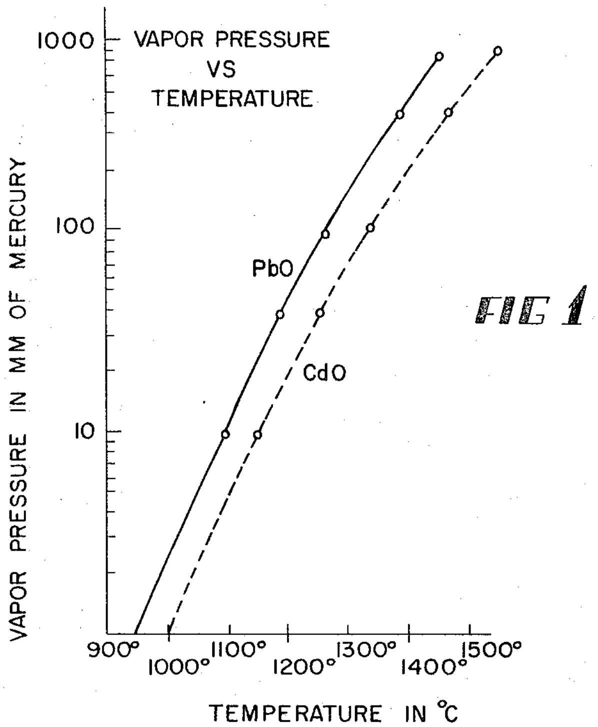
FIGURE 1 is a plot of vapor pressure versus temperature for lead oxide and cadmium oxide.

There have been two procedures used in the prior art for the firing of these type ceramics to achieve the necessary reaction of constituents and densification of the final product. The major problem involves the densification of the product as opposed to the problem of the reaction of the constituents. In order to achieve useful densities, it has been necessary to use either hot pressing or very high temperatures. Hot pressing is a rather expensive process and requires additional equipment. When atmosphere firing of the parts is utilized, the volatility of the lead oxide at high temperatures becomes a problem as can be seen from FIGURE 1. In order to counterbalance the tendency of the lead oxide to volatilize from the composition, an additional quantity of the material such as lead zirconate is included within the reaction chamber to supply the lead oxide to the atmosphere. While such a process is workable, the elevated temperatures and the toxicity of the lead oxide are problems which increase the cost of such processing.

Samples used in the experiments discussed below were prepared according to conventional techniques. The proper quantities of the respective ingredients were blended, as oxides, calcined at 900° C., reground, and pressed into the desired shapes. They were then placed in crucibles having a tight fitting lid to prevent loss of the volatiles. Calcining can be omitted, but is the preferred method of preparation. A quantity of lead zirconate was placed in the control crucible in accordance with procedures of the prior art whereas a quantity of lead zirconate and cadmium oxide were utilized in the crucible used in preparing samples according to the present invention. The quantity of lead zirconate or lead zirconate plus cadmium oxide needed varies somewhat with the size of the crucible and the size of the charge. As the problem is one of maintaining a substantially saturated atmosphere, this can best be solved empirically taking into account volatility losses. A satisfactory, but by no means limiting, composition of the lead zirconate plus cadmium oxide is 90% lead zirconate and 10% cadmium oxide. The quantity of this used as compared to the charge being fired is on the order of 1 part in 10.

Figure 2:
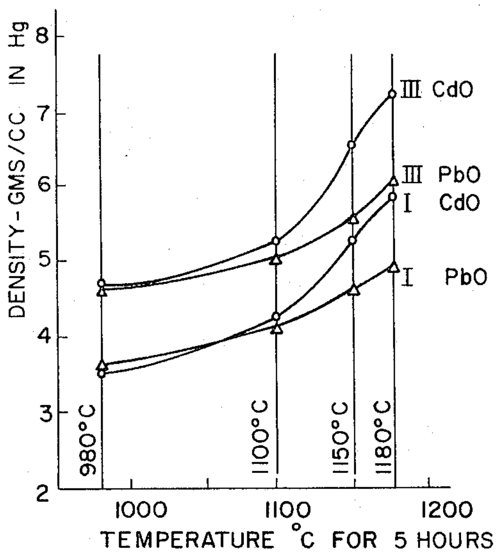
FIGURE 2 is a plot of density versus temperatures for samples prepared in accordance with the present invention and prepared in accordance with prior art techniques wherein a firing period of five hours was used.

Referring now to FIGURE 2, there is shown a plot of density versus temperature for firing periods of 5 hours for samples both of the prior art and in accordance with the present invention. The curves are identified in accordance with the nomenclature given above for various commercial samples. The atmosphere used in the firing is either indicated as PbO or CdO—these representing either the case of lead zirconate alone or the lead zirconate plus cadmium oxide. The curves are believed self-explanatory. It can be seen that the density of the finished product after a period of 5 hours of firing is markedly higher at all temperatures than is the density of articles fired in accordance with the lead oxide atmosphere of the prior art.

Figure 3:
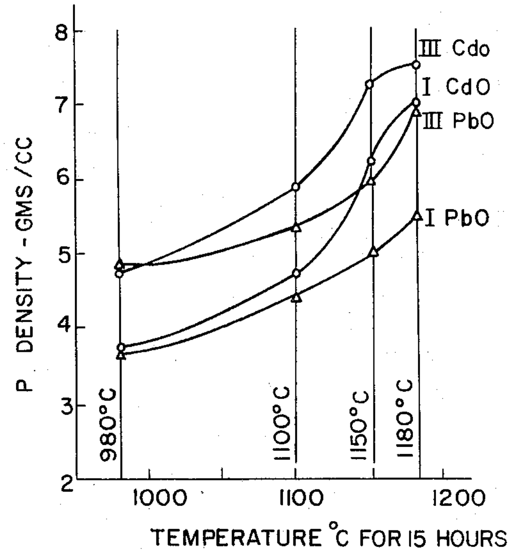
FIGURE 3 is a plot of density versus temperature for samples as in FIGURE 2 with the exception that the firing period was 15 hours.

In FIGURE 3 there is indicated a similar plot wherein the samples have been fired for a period of 15 hours. Again, as in FIGURE 2, the results show clearly the advantages of using the cadmium oxide atmosphere.

Figure 4:
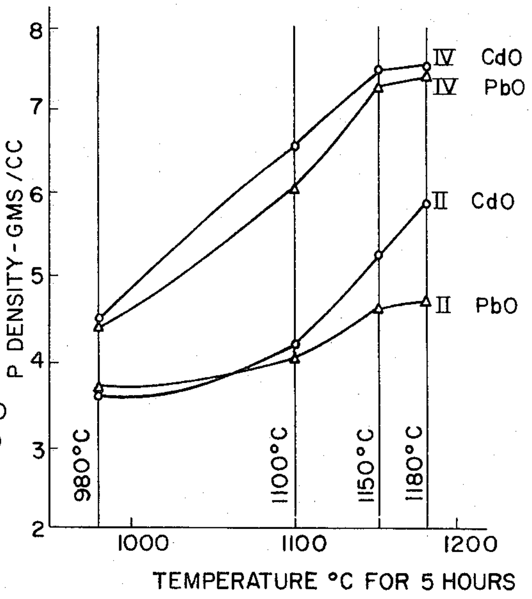
FIGURE 4 is a plot of density versus firing temperature for samples fired for 5 hours wherein the samples are of different compositions from those in FIGURES 2 and 3.

In FIGURE 4, there is indicated a similar plot of density versus temperature for a firing period of 5 hours for compositions II and IV using the method of the prior art and of the present invention. Again, the results are believed self-evident as to the advantages of the present invention.

Figure 5:
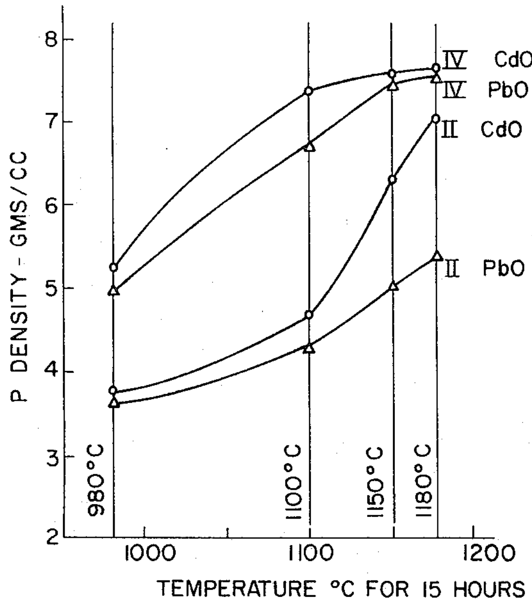
FIGURE 5 is a plot of density versus temperature for samples of FIGURE 4 fired for a period of 15 hours.

In FIGURE 5, there is shown the results of density versus temperature when the samples of FIGURE 4 are fired for a period of 15 hours.

No exact figures can be given for the necessary density of these products. As a general rule, a density of about 7.4 is desirable in order to attain a sufficient degree of ease of polarization. Somewhat lower values have been found useful by prior investigators and the same holds true here. The greater the density, the better the overall properties of the finished products, however.

Figure 6:
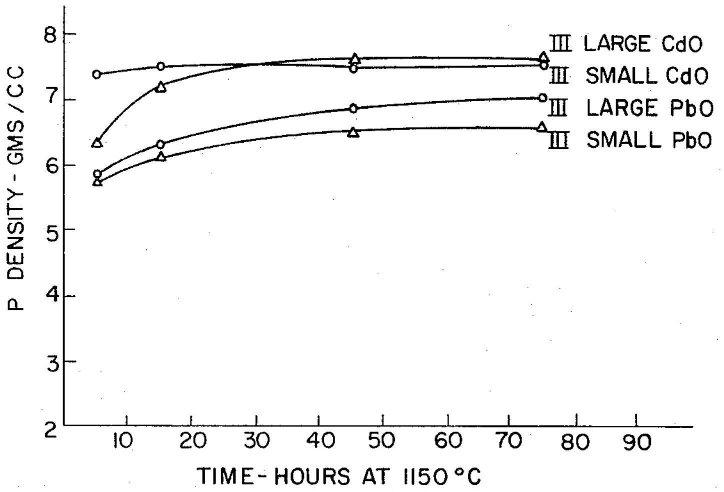
FIGURE 6 is a plot of density versus time of firing for large and small sized samples fired at 1150° C.

In FIGURE 6, there is shown a plot of density versus firing time in hours at 1150° C. for samples of the prior art as well as of the present invention showing the effect of sample size on the final density. The dimensions of the samples are given below. This graph shows clearly that the invention is equally applicable to very small size samples as well as to fairly massive parts.

Large samples:
- Approx., cm. diameter — 4.5
- Approx., cm. height — 2.0

Small samples:
- Approx., cm. diameter — 2.0
- Approx., cm. height — 0.2

As noted previously, the invention provides the advantages of reduced firing temperatures without adverse effect upon the various electrical and piezoelectrical properties of the material. As indicated below in Table I, both small and large samples were fired to report the effect of the cadmium oxide atmosphere on the piece parts. For comparison purposes, material prepared in accordance with prior art techniques are also given. Polarization of samples was accomplished in the manner well known in the art by applying a high field at elevated temperatures.

TABLE I.—DIELECTRIC AND PIEZOELECTRIC DATA

| Material and Comments | $K_0$ | $D_0$ | $K_3$ | $D_3$ | $k_p$ |
|---|---|---|---|---|---|
| IV—Material, atmosphere PbO fired at 1,320° C. | 1,150 | 2.00 | 1,600 | 2.00 | 0.52 |
| IV—Material (CdO+PbO), atmosphere at 1,150° C. for 45 hours; fired slug, 35 gms.; sliced discs for electrical measurements, 2.5 gms.; average for 5 discs. | 1,160 | 1.61 | 1,660 | 1.48 | 0.55 |
| III—Material, atmosphere PbO fired at 1,320° C. | 1,000 | 0.4 | 1,200 | 0.4 | 0.52 |
| III—Material (CdO+PbO), atmosphere at 1,150° C. for 45 hours; fired slugs, 35 gms.; sliced discs for electrical measurements, 2.5 gms.; average for 5 discs. | 1,025 | 0.35 | 1,250 | 0.35 | 0.47 |
| III—Material (CdO+PbO), atmosphere at 1,150° C. for 45 hours; fired slug, 200 gms.; sliced discs for electrical measurements, 3.9 gms.; average for 3 discs. | 1,080 | 0.34 | 1,310 | 0.30 | 0.55 |

KEY:
$K_0$—Unpoled dielectric constant.
$D_0$—Unpoled dissipation factor.
$K_3$—Dielectric constant in the direction of polarization, 24 hours after poling.
$D_3$—Dissipation factor in the direction of polarization, 24 hours after poling.
$k_p$—Radial coupling coefficient, 24 hours after poling.

I claim:

1. The method of producing a dense ceramic of lead zirconate-lead titanate which comprises preparing a mixture of lead zirconate-lead titanate wherein the atomic ratio of Zr to Ti is from 90:10 to 40:60, forming the mixture into the desired shape, placing the mixture into a chamber, introducing a quantity of cadmium oxide separate from said shaped mixture into said chamber, and heating the chamber to a temperature in excess of 980° C.

2. The method in accordance with claim 1 wherein the final firing temperature is 1150° C.

3. The method of preparing a dense ceramic of lead zirconate-lead titanate which comprises preparing a mixture of PbO, $ZrO_2$, and $TiO_2$ wherein the atomic ratio of Zr to Ti is from 90:10 to 40:60, calcining said mixture to react the constituents, placing the reacted mixture into a chamber, introducing a quantity of cadmium oxide separate from said reacted mixture into said chamber, and heating the chamber to a temperature in excess of 980° C.

4. The method of producing a dense ceramic having the approximate empirical formula $Pb_{.95}Sr_{.05}Zr_{.55}Ti_{.45}O_3$ comprising preparing a mixture of PbO, $ZrO_2$, SrO and $TiO_2$ in amounts to provide the composition of said formula, calcining said mixture to react the constituents, placing the reacted mixture into a chamber, introducing a quantity of cadmium oxide separate from said reacted mixture into said chamber, and firing the mixture at a temperature in excess of 980° C.

5. The method of producing a dense ceramic of lead zirconate-lead titanate doped by the addition of lead niobate comprising preparing a mixture of PbO, $ZrO_2$, $TiO_2$, and $Nb_2O_5$ to provide a mixture having the approximate empirical formula $PbZr_{.53}Ti_{.47}O_3+.0123PbNb_2O_6$, calcining said mixture to react the constituents, placing the mixture into a chamber, introducing a quantity of cadmium oxide separate from said reacted mixture into said chamber, and heating the chamber to a temperature in excess of 980° C.

References Cited by the Examiner

UNITED STATES PATENTS 2,708,244 5/1955 Jaffe — 252—62.9
2,721,182 10/1955 Clement — 106—39
2,911,370 11/1959 Kulcsar — 252—62.9

TOBIAS E. LEVOW, *Primary Examiner.*

R. D. EDMONDS, *Assistant Examiner.*